Feb. 21, 1950        H. HAMILTON        2,498,161
CARGO HANDLING MEANS
Filed July 11, 1947
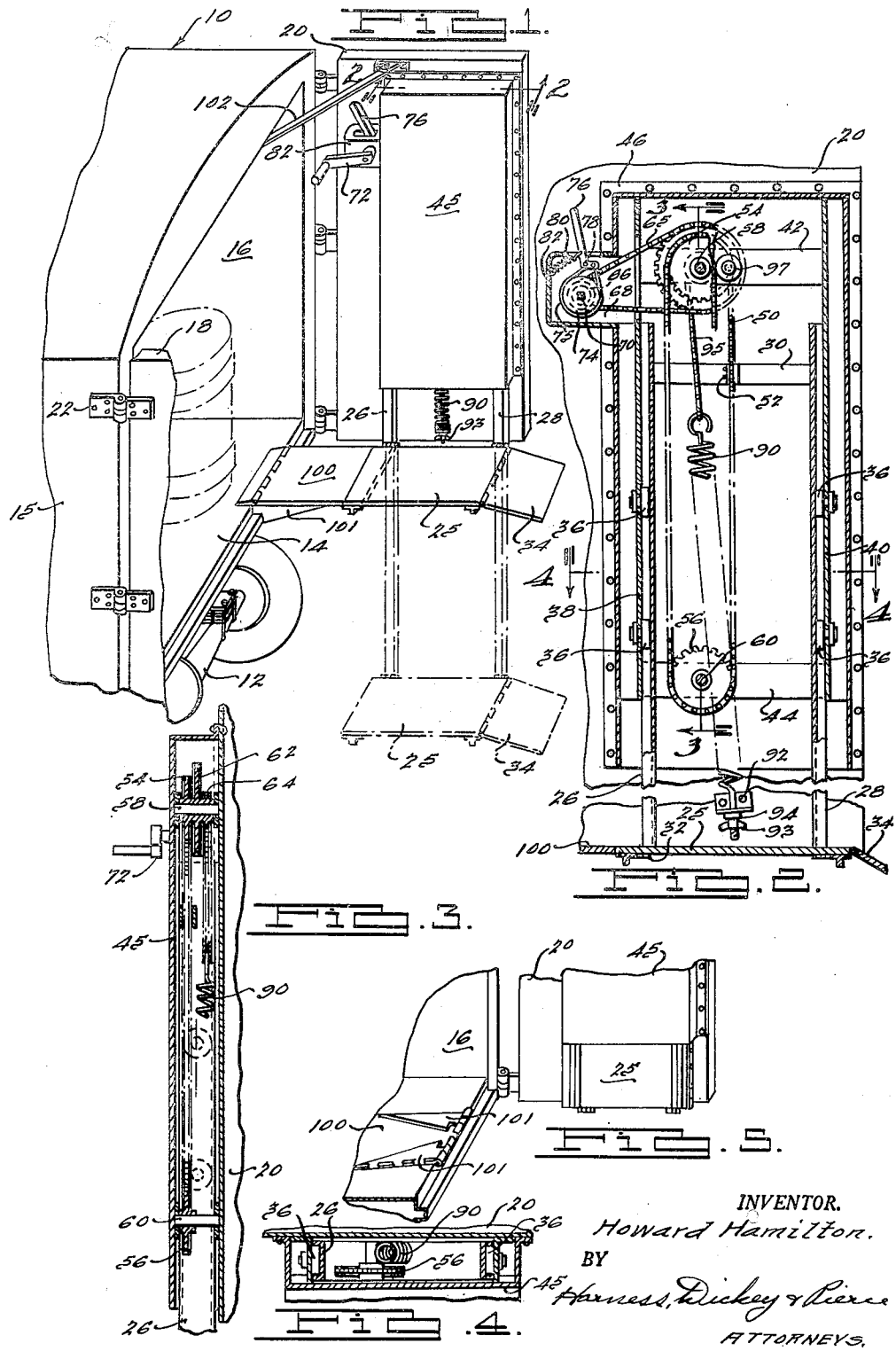
INVENTOR.
Howard Hamilton.
BY
Harness, Dickey & Pierce
ATTORNEYS.

Patented Feb. 21, 1950

2,498,161

UNITED STATES PATENT OFFICE 2,498,161

CARGO HANDLING MEANS

Howard Hamilton, Detroit, Mich., assignor to Howard Hamilton, Homer E. Helm, Thomas L. Conlon, and John H. Pace, doing business as The Elvadoor Company, Detroit, Mich., a copartnership Application July 11, 1947, Serial No. 760,284

5 Claims. (Cl. 214—75)

The present invention relates to cargo lifting devices and to the construction of cargo handling vehicles, and contemplates among its broad objects the provision of improved means for raising and lowering cargo to and from an elevated cargo space such as the floor of a truck or other cargo carrying conveyance.

Another important object of the invention is to provide such cargo handling means adapted to be installed upon closed truck bodies as an accessory attachment and to serve as a lift for lowering cargo to ground level and for raising cargo to truck floor level, the lift means being so constructed as to occupy very little space within the vehicle and an efficient and conveniently usable elevator platform being provided which is operable by hand but which is of adequate capacity to handle relatively heavy loads.

Another object is to provide an improved vehicle lift construction designed for handling standardized cargo receptacles which are of standardized and predetermined weights when filled and when empty, my improved lift means incorporating counterbalancing means tending to raise the lift platform with effort which is insufficient to raise the standardized receptacles when filled, but which is sufficient to raise the receptacles when empty. This arrangement is such that filled receptacles may be lowered from a truck equipped with my improved lift means without effort on the part of the truckman, while after filled receptacles have been lowered, empty receptacles may be raised to truck floor level, also without effort on the part of the truckman.

Another object is to provide an improved lift of the indicated character which is also suitable for handling loads of various weights and which incorporates means for positively driving the load-carrying platform in the downward direction against the effort of the counterbalancing means as well as upwardly.

Still another object is to provide such an improved lift including normally set but selectively releasable friction brake means for holding the load-carrying platform stationary except when deliberately released by the operator.

A further object is to provide such an improved lift structure which is of light weight and compact construction but capable of handling relatively heavy loads.

Other objects and advantages will be apparent upon consideration of the present disclosure in its entirety.

In the drawing:

Figure 1 is a fragmentary perspective view of the rear portion of a motor truck having a closed body and equipped with cargo handling means constructed in accordance with the present invention;

Fig. 2 is a vertical sectional elevational view showing the lift operating mechanism and taken substantially as indicated by the line and arrows 2—2 of Fig. 1;

Figs. 3 and 4 are cross sectional views taken substantially on the lines 3—3 and 4—4 respectively of Fig. 2 and looking in the direction of the arrows;

Fig. 5 is a fragmentary perspective view of a part of the lift structure and adjacent truck portions shown in Fig. 1 but with certain of the cargo supporting portions folded to the positions they occupy when not in use.

Referring now to the drawing, reference character 10 designates generally a closed vehicle body for the transportation of commercial cargo. The body is shown as carried by and forming part of a motor truck, the running gear of which is fragmentarily illustrated at 12 and the details of construction of which will not be considered since they form no part of my present invention. The body is indicated as provided with a flat floor 14 and with side wall panels 15, 16, to the rear of which doors 18, 20 are hinged as by conventional hinge means 22.

My improved lift means is designed to be attached to and carried by the inner surface of one of the doors as 20 and includes a lift platform 25 movable vertically while remaining in horizontal position, the travel of the platform being such that it may be moved from a raised position in which it is substantially coplanar with respect to the floor 14, as shown in full lines in Fig. 1, to a lowered position, shown in broken lines in Fig. 1, in which it rests upon the ground or roadway.

The platform 25 is carried by a vertically movable framework consisting of a pair of oppositely outwardly opening channeled rails 26, 28 guided for vertical movement in a path close to the inner face of the door 20 and joined near their upper ends by a rigid crosstie member 30. At their lower ends the rails 26, 28 are connected to the platform 25 by means of hinges 32 which permit 90° swinging movement of the platform from the horizontal load supporting position in which it is shown in Fig. 1 to the vertical position shown in Fig. 5 in which it lies flat against the inner face of the door. A toe board 34 is hinged to the outer edge of the platform 25 in such manner that it may lie in an inclined position to provide a smooth inclined connecting surface over which cargo may be moved between the platform and the ground, or may be folded inwardly to lie flat against the platform when not in use.

The rails 26, 28 are guided by means of rollers 36 carried by stationary bars 38, 40 supported upon the inner face of the door 20 in vertical positioning and spaced apart a distance somewhat exceeding the spacing of the track members 26, 28, a plurality of such rollers being carried in vertically spaced relation by each of the bars 38, 40 and the rollers being positioned and proportioned to project into the track members 26, 28 and permit easy sliding movement of the latter. The bars 38, 40 are formed as angle irons having the flanges which carry the rollers 36 projecting perpendicularly from the inner face of the door, the flanges thereof parallel to the face of the door being joined by flat crossbars as 42, 44 which reinforce the same and serve to support sprocket wheels and related members forming part of the actuating means for the lift frame. It will be appreciated that the bars and cross bracing members may be secured together by welding. It will also be noted that a cover 45 is provided having a flange 46 by which it may be directly secured to the inner face of the door, to enclose the lift frame structure and its actuating means.

The actuating means for the lift frame comprises an endless sprocket type chain 50 secured at one point as by clamping means generally designated 52 to the vertically movable crossbar 30 attached to and forming a part of the lift frame structure. The chain 50 is trained over vertically spaced sprocket wheels as 54, 56 one of which is rotatably supported by each of the stationary crossbars 42, 44 respectively, as upon the stub shaft 58, 60 respectively secured to and rigidly projecting inwardly from each of the last mentioned crossbars. It will be seen that the straight runs of the chain 50 extending between said sprocket wheels are also vertical and that the actuation of the chain serves to raise and lower the lift frame structure and the platform 25 carried thereby.

Two additional sprocket wheels 62, 64 are mounted upon the stub shaft 58 in such manner as to turn as a unit with the sprocket wheel 54. Sprocket wheel 62 is connected by an actuating chain 65 to a driving sprocket 66 rotatably mounted nearer the hinged edge of the door 20 upon a laterally inwardly extending supporting plate 68 welded to the aforementioned stationary portions of the framework and also lying flat against the face of the door. Driving sprocket 66 is fast upon and adapted to be rotated by a shaft 70 which projects accessibly from the face of the door and is provided with a squared extremity adapted to receive a conformably socketed removable actuating crank 72. Shaft 70 also carries fast thereupon a brake drum 74. A brake band 75 engageable with the drum is actuatable by a handle 76 pivoted upon the frame plate 68 as upon the pin designated 78. A helical tension spring 80 yieldably maintains the handle 76 in such position that the brake band 75 engages the drum 74 forcibly enough to hold the platform stationary even when it is carrying the maximum load for which the equipment is designed. The actuating sprocket and brake mechanism may be enclosed by a supplemental cover portion 82.

The weight of the platform and connected portions of the structure acted upon by gravity is counterbalanced by a relatively long helical tension spring 90 adjustably anchored at its lower extremity to a bracket 92 attached to the inner face of the door. The lower end of the spring extends through the bracket 92 and is threaded to receive the adjusting wing nut 93 and lock nut 94. The spring extends upwardly beneath the cover 45 and at its upper extremity is connected to a sprocket type chain 95 which is trained over sprocket wheel 64 and maintained in engagement therewith by a guide roller 97. Chain 94 is wrapped over sprocket 64 in such direction that spring 90 tends constantly to lift the platform 25.

A supplemental gang plate as 100 may also be hingedly attached to the rear edge of the truck floor 14, and triangular bracing plates 101 are hingedly attached to the plate 100 to support the latter when extended and to fold flat when the gang plate is swung inwardly over the floor of the truck. A prop element as 102 is preferably also provided for each of the doors 18 and 20, the prop element for door 20 being designed to hold the door in a position in which it projects perpendicularly from the plane of the door opening. The gang plate 100 is of such length that it closely abuts the platform 25 when the latter is raised and when the door is in the perpendicular position, as shown in full lines in Fig. 1. It will be apparent that this permits convenient sliding or rolling of cargo to and from the truck floor and lift platform. When swung inwardly to the position in which it is shown in Fig. 5, the plate 100 is out of the way and permits the door 20 to swing shut.

If the truck is designed for carrying standardized cargo such for example as receptacles for liquid, which receptacles are delivered in filled condition by the truck and are picked up empty by the same truck for return to a point of origin, the lift and its counterbalancing means may be so designed that the spring 90 exerts an upward force on the platform which is less than the downward force represented by the weight of the filled receptacles or other standardized cargo containers, but greater than the weight of the empty containers. Thus the truckman, under normal conditions, need never operate the winch by means of the crank 72, and the crank, which is preferably of the removable type as indicated, may in fact never be applied to the shaft 70 except under unusual or emergency conditions when handling such cargo. Ordinarily the loading and unloading of such trucks at the point of origin will be performed at a loading dock so that the lift mechanism need not then be used. The prop means 102 is accordingly so arranged that it may be released completely to permit the door 20 to be swung back parallel to and outside the side wall 16 of the truck, where it does not interfere with use of the truck at loading docks. In the delivery of loaded receptacles, however, at points where no unloading dock is available, such receptacles may merely be slid from the truck floor over the gang plate 100 and onto the platform 25, which remains stationary due to the effect of the spring 80 which maintains the brake mechanism set as previously explained. Since the loaded receptacles are heavy enough to overcome the action of the counterbalancing means, the truckman need only release the brake 76 to permit the loaded receptacle to be lowered under the effect of gravity to ground level, and it will be appreciated that the rate of descent may be controlled with great exactitude and extreme ease by manipulation of the handle 76. Upon release of the handle 76 the brake is again automatically set, the cargo may be removed and the platform remains at ground level. An empty receptacle may then be placed on the platform 25 and when the brake is again released by means of the handle 76, since the empty receptacle is of insufficient weight to offset the action of the counterbalancing means, the platform is automatically raised by the counterbalancing spring to level the platform with the gang plate 100. The empty receptacle may then easily be slid over the plate 100 and into the truck. After completion of such operation it will be appreciated that the truckman need only fold up the platforms 34, 25, 100, close the rear doors of the truck and is ready to proceed. Where standard receptacles are being handled, these operations may be repeated an indefinite number of times without the expenditure of effort by the truckman, despite which no power operating means is required for the lift. The tension adjusting means 93, 94 for the counterbalancing spring permits virtually effortless handling of loads of various weights, while if the truckman desires to handle cargo which is beyond the range of spring adjustment, the winch mechanism provides multiplication of power such that it may also be easily raised and lowered by manual manipulation of the crank and brake mechanism.

While it will be apparent that the preferred embodiment of my invention herein disclosed is well calculated to fulfill the advantages and objects first above stated, it will be apparent that the invention is susceptible to modifications and change without departing from the fair scope and proper meaning of the appended claims.

I claim:

1. In combination with a closed vehicle body having a doorway opening and a door for closing said opening hinged to the body for swinging movement about a substantially vertical axis, lift means carried by the inner face of the door including a load supporting member and means carried by the door for lowering said member with relation to the door and doorway and for raising said member to a position substantially in line with the bottom of said door and doorway.

2. A lift structure adapted to be mounted upon the inner surface of a vehicle door comprising a lift frame of relatively flat construction, actuating means for moving said frame vertically with relation to such a door and a load supporting platform pivotally connected to said frame and swingable from a position in which it projects substantially horizontally from the frame to a position in which it lies substantially parallel to the same.

3. Means as set forth in claim 1 including counterbalancing means for said load supporting members, said counterbalancing means exerting sufficient effort to raise said member against the effect of gravity, and releasable holding means for preventing movement of said member.

4. In combination with a closed vehicle body having a doorway opening and a door for closing said opening hinged to the body for swinging movement about a substantially vertical axis, lift means carried by the inner face of the door including a load supporting member and means carried by the door for lowering said member with relation to the door and doorway and for raising said member to a position substantially in line with the bottom of said door and doorway including counterbalancing means for said load supporting member, said counterbalancing means exerting sufficient effort to raise said member against the effect of gravity, releasable braking means for preventing movement of said member, and yieldable means normally maintaining said braking means in set condition.

5. A lift structure adapted to be mounted upon the inner surface of a vehicle door comprising a lift frame of relatively flat construction, actuating means for moving said frame vertically with relation to such a door, a load supporting platform pivotally connected to said frame and swingable about a substantially horizontal axis from a position in which it projects substantially horizontally from the frame to a position in which it lies substantially parallel to the same, and a ramp pivoted to said platform on an axis perpendicular to the previously mentioned axis.

HOWARD HAMILTON.

REFERENCES CITED

The following references are of record in the file of this patent:

UNITED STATES PATENTS

| Number | Name | Date |
| --- | --- | --- |
| 1,919,608 | Troell | July 25, 1933 |
| 2,159,623 | Schmidt | May 23, 1939 |
| 2,203,310 | Shonnard | June 4, 1940 |
| 2,362,809 | Evans | Nov. 14, 1944 |
| 2,405,054 | Pringle | July 30, 1946 |
| 2,421,128 | Pride | May 27, 1947 |
| 2,442,549 | Pearlman | June 1, 1948 |